No. 761,219. PATENTED MAY 31, 1904.
B. A. GOODWIN.
LEVELING INSTRUMENT.
APPLICATION FILED FEB. 8, 1904.
NO MODEL. 2 SHEETS—SHEET 1.
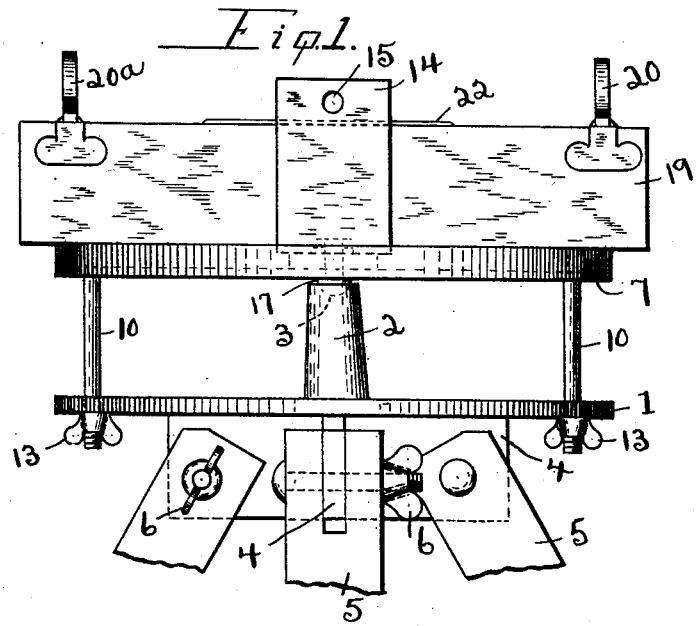
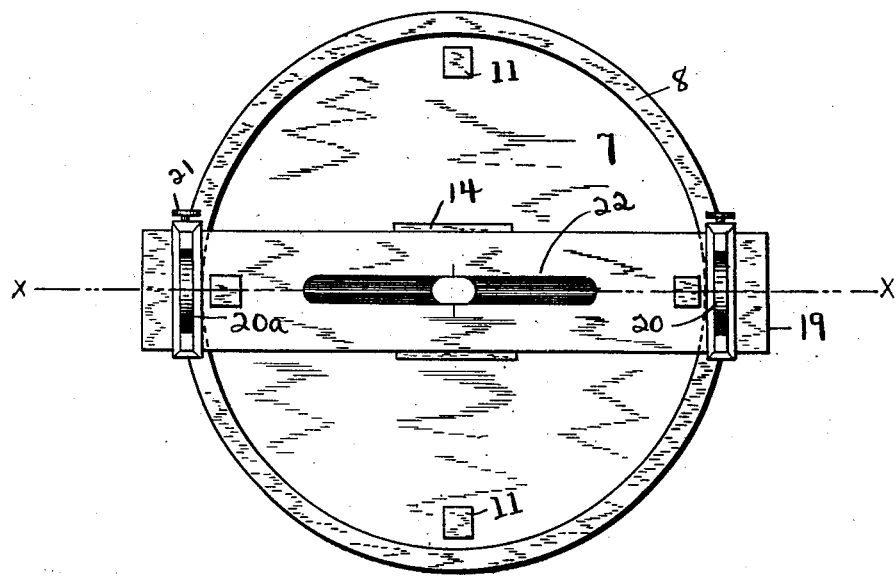
Witnesses
Percy S. Webster.
Lena Williams.
Inventor
Benjamin A. Goodwin
By Joshua B. Webster.
Attorney No. 761,219. PATENTED MAY 31, 1904.
B. A. GOODWIN.
LEVELING INSTRUMENT.
APPLICATION FILED FEB. 8, 1904.
NO MODEL. 2 SHEETS—SHEET 2.
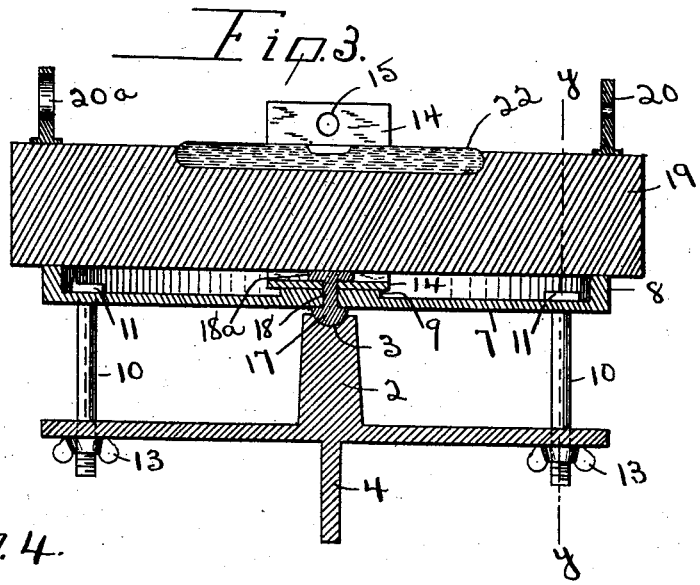
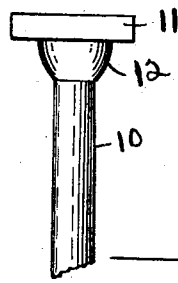
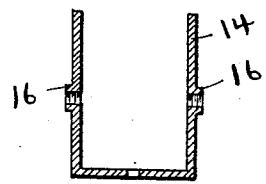
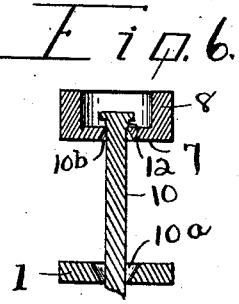
Witnesses
Percy S. Webster
Lena Williams
Inventor
Benjamin A. Goodwin
By Joshua B. Webster
Attorney No. 761,219.

Patented May 31, 1904.

UNITED STATES PATENT OFFICE.

BENJAMIN A. GOODWIN, OF LATHROP, CALIFORNIA.

LEVELING INSTRUMENT.

SPECIFICATION forming part of Letters Patent No. 761,219, dated May 31, 1904.

Application filed February 8, 1904. Serial No. 192,544. (No model.)

*To all whom it may concern:*

Be it known that I, BENJAMIN A. GOODWIN, a citizen of the United States, residing at Lathrop, in the county of San Joaquin and State of California, have invented certain new and useful Improvements in Leveling Instruments; and I do declare the following to be a full, clear, and exact description of the same, such as will enable others skilled in the art to which it appertains to make and use the same, reference being had to the accompanying drawings, and to the numerals of reference marked thereon, which form a part of this specification.

My invention relates to improvements in leveling instruments used by carpenters, surveyors, &c., and particularly to that class used in leveling land for irrigation; and my object is to produce such an instrument as may be easily and cheaply constructed and one which will be accurate and effective for the work for which it is designed.

This object I accomplish by the peculiar construction and adaptation of parts hereinafter described in this specification, and particularly pointed out in the claims appended.

Referring to the drawings, Figure 1 is a side elevation of my improved instrument. Fig. 2 is a top plan view of the same. Fig. 3 is a longitudinal section taken on a line X X of Fig. 2. Fig. 4 is an enlarged detached view of the upper end of an adjusting-pin. Fig. 5 is a side sectional view of a level-block holder. Fig. 6 is a sectional view taken on a line $y\ y$ of Fig. 3 with some of its parts not shown.

Similar numerals of reference indicate corresponding parts in the several views.

1 designates a circular base-plate.

2 designates a standard extending upward from the center of the base-plate 1 and forming a component part thereof.

3 is a concave socket in the top of the standard 2.

4 designates downwardly-extending plates forming component parts of the base-plate 2. On the plates 8 are pivot legs or supports 5. The positions of these legs are regulated by means of thumb-screws 6.

7 is an adjustable circular table of the same diameter as the plate 1, resting on the standard 2 in a manner as will be hereinafter shown.

8 is an upwardly-projecting ring around the outer edge of the table 7, forming a component part thereof.

9 is an upwardly-projecting lug in the center of the table 7, said lug and table being suitably centrally orificed for the purpose, as will be shown.

10 designates adjusting-pins provided with heads 11 and having curved shoulders 12 for the purpose, as will be hereinafter fully shown. Said pins fit in orifices $10^a$ and $10^b$, suitably located in the plate 1 and table 7, respectively. The orifices $10^a$ flare upwardly, and the orifices $10^b$ flare downwardly in order to give the said pins 10 full play. The said pins 10 are threaded at their lower extremities, so as to receive wing-nuts 13.

14 designates a level-block holder, the position of which will be hereinafter shown. The bottom of said level-block holder is centrally orificed for a purpose, as will be shown.

15 designates orifices in the upper part of the sides of said level-block holder 14.

16 designates modifications of the orifices 15.

17 is the head of a rivet seated in the socket 3.

18 is the shank of said rivet.

$18^a$ designates the end of the shank 18 flattened. The shank 18 extends upwardly through the central orifices in the table 7, the lug 9, and the bottom of the level-block holder 14. It is then flattened, forming the part 18 and securing the level-block 14 to the lug 9 and table 7. The rivet-head 17 is of sufficient height to hold the bottom of the table 7 slightly above the top of the standard 2, and thus give said table free swing when it is being adjusted. The sum of the heights of the lug 9, the bottom of the level-block holder 4, and the part $18^a$ is about equal to the height of the ring 8 or a little lower.

19 is a level-block resting on the part $18^a$ in the level-block holder 14 and on the top of the ring 8. At the extremities of said level-block are suitable sights 20 and $20^a$.

21 and $21^a$ are set-screws adapted to secure the sights 20 and 20ª, respectively, to the said block 19.

22 is a longitudinal level-tube located in the center of the top of the level-block 14.

The operation is as follows: The plate 7, pivoted on the standard 2 by means of the rivet-head seated in the socket 3, is adjusted, by means of the adjusting-pins 10 and nuts 13, until the bubble in the level-tube shows the level-block 19 to be level. The said block 19, seated in the level-block holder rotating on the shank 18 and resting on the ring 8, is turned at any angle desired, and the sights 20 and 20ª are then used in the usual manner.

Through the orifices 15 a pin and thumb-screw similar to 10 and 13 may be inserted for the purpose of tightly securing the block 19 in the holder 14, or set-screws may be inserted in the threaded orifices 16 and the block secured by means of them. Still another method would be to bore a hole through the block 19 and insert a bolt through it and the orifices 16 and tighten it by means of a thumb-screw on the threaded portion of said bolt.

I provide rounded shoulders 12 on the adjusting-pins 10, so that the same will swing freely in the orifices 10ᵇ.

In practice I intended to level off the corners of the top of the standard 2, so as to give the table 7 all possible freedom in its movement.

Any suitable sights may be substituted for the sights 20.

The top or side of the ring 8 may be graduated into degrees and a corresponding notch made in the block 19, so that the exact angle desired may be obtained. This is not necessary, however, for the purpose for which I use my instrument.

I have entered into a detailed description of the relative arrangement and adaptation of parts as set in the present and preferred embodiment of my invention. I do not desire, however, to be understood as confining myself to such specific construction, as many changes and modifications may be made in practice as fairly fall within the scope of my claims.

I am aware that it is not new to use a sight-level seated on a tripod. Hence I do not broadly claim that feature; but,

Having thus described my invention, what I do claim as new and useful, and desire to secure by Letters Patent, is—

1. The herein-described leveling instrument consisting of a suitable base-plate, a standard extending upwardly from the center of said base-plate and forming a component part thereof, a concave socket in the top of said standard, downwardly-projecting plates forming component parts of said base-plate, suitable legs attached to said plates, means for regulating the position of said legs on said plates, a rivet-head seated in the socket in the top of the said standard, an upwardly-projecting shank on said rivet, an adjustable table fitted on said shank, a level-block holder also fitted on said shank above said table, the head of said shank being flattened so as to secure said table, level-block holder, and rivet-head together, an upwardly-projecting ring around the outer edge of said table forming a component part thereof, a level-block, provided with a level-tube, seated in said level-block holder and resting at its ends on the said upwardly-projecting ring, suitable sights on said block, and suitable adjusting-pins connecting the said table to the said base-plate, all as set forth and described.

2. The combination with a base-plate provided with a standard 2 having a concave socket 3 in the top thereof, and a suitable tripod, of a table 7 provided with the upward-projecting lug 9, said table and lug being centrally orificed, the level-block holder 14, said holder being centrally orificed in the bottom thereof, the rivet 17 18 18ª joining said plate and holder together, the rivet-head 17 seated in the socket 3, the upwardly-projecting ring 8 forming a component part of the table 7, the adjusting-pins 10, provided with heads 11 and shoulders 12, connecting the table 7 and the base-plate, said pins being threaded at their lower ends and receiving wing-nuts 13, said nuts bearing against the under face of said base-plate, the level-block 19 seated in the holder 14 and resting on the ring 8, said block being provided with suitable level-tube and sights, all as set forth.

3. The base-plate 1, the standard 2 projecting upwardly from the center of said base-plate and forming a component part thereof, the concave socket 3 located in the top of the standard 2, the downwardly-projecting plates 4 forming component parts of the base-plate 1, the legs 5 attached to said plates 4, the screws 6 adapted to secure the position of said legs on said plates 4, the table 7, the upwardly-projecting rings 8 forming a component part of the table 7 at the circumference thereof, the upwardly-projecting lug 9 forming a component part of the table 7 at the center thereof, said lug and table being centrally orificed, the level-block holder 14, said holder being centrally orificed in the bottom thereof, the rivet 17 18 18ª binding the table 7 and holder 14 together, the rivet-head 17 seated in the socket 3, said rivet-head being of sufficient size to hold said table a little distance above the top of the standard 2, the orifices 10ª located at suitable points in the plate 1 and flaring upwardly, the orifices 10ᵇ located in the table 7 at points directly opposite the orifices 10ª and flaring downwardly, the adjusting-pins 10 provided with heads 11 and curved shoulders 12, said pins operating in the slots 10ª and 10ᵇ, threading on the lower ends of said pins, the nuts 13 on said threading, the block 19 seated in the holder 14 and resting on the ring 8, said block being provided with a suitable level-tube and sights, and the orifices 16 in the holder 14 adapted to receive set-screws to fasten the block 19 in the said holder, all as set forth.

4. A device of the type set forth, comprising a base-plate having a standard formed with a socket on its top, a table having an upwardly-extending ring about its edge, a level-holder of U shape on the table, a rivet passed through the holder and table and having its ends headed, the lower end of the rivet being shaped to seat in said socket, and bolts having their heads seating on the table and their lower ends passed through the base-plate with nuts on the lower ends bearing against the under face of the base-plate.

In testimony whereof I have signed my name to this specification in the presence of two subscribing witnesses.

BENJAMIN A. GOODWIN.

Witnesses:
PERCY S. WEBSTER,
JOSHUA B. WEBSTER.